United States Patent
Howell, Jr. et al.

(10) Patent No.: US 8,577,658 B2
(45) Date of Patent: Nov. 5, 2013

(54) NUMERICAL TOOLBOX FOR DESIGN OF FLUIDIC COMPONENTS AND SYSTEMS

(75) Inventors: Peter B. Howell, Jr., Gaithersburg, MD (US); David Mott, Burke, VA (US); Joel P. Golden, Fort Washington, MD (US)

(73) Assignee: The United States of America as repesented by the Secretary of the Navy, Washington, DC (US)

( * ) Notice: Subject to any disclaimer, the term of this patent is extended or adjusted under 35 U.S.C. 154(b) by 1346 days.

(21) Appl. No.: 11/682,068

(22) Filed: Mar. 5, 2007

(65) Prior Publication Data

US 2008/0221844 A1    Sep. 11, 2008

(51) Int. Cl.
G06G 7/50    (2006.01)
G06G 7/48    (2006.01)
G06F 7/60    (2006.01)
G06F 17/10   (2006.01)

(52) U.S. Cl.
USPC .................................................. 703/9; 703/2

(58) Field of Classification Search
USPC ........................................... 703/2, 9; 702/12
See application file for complete search history.

(56) References Cited

PUBLICATIONS

Howell, et al. "A Microfluidic Mixer with Grooves Places on the Top and Bottom of the Channel" Lab on a Chip 5, 524-530 (2005).*
Yang, et al. "Mixing and Separation of Two-Fluid Flow in a Micro Planar Serpentine Channel" Journal of Micromechanics and Microengineering, 16, 2439-2448, Oct. 4, 2006.*
Yang et al. "Geometric effects on fluid mixing in passive grooved micromixers", Aug. 18, 2005, Lab on a Chip, 5, pp. 1140-1147.*
Wang et al. "System-oriented dispersion models of general-shaped electrophoresis microchannels", Jul. 30, 2004, Lab on a Chip, 4, pp. 453-463.*
Mott et al. "Toolbox for the design of optimized microfluidic components", Lab Chip, Mar. 3, 2006, pp. 540-549.*
Molho, Joshua I.; Herr, Amy E.; Mosier, Bruce P.; Santiago, Juan G.; Kenny, Thomas W.; Brennen, Reid A.; Gordon, Gary B.; and Mohammadi, Bijan. "Optimization of Turn Geometries for Microchip Electrophoresis." Analytical Chemistry, vol. 73, No. 6, Mar. 15, 2001, 1350-1360.
B. Mohammadi, J.I. Molho, J.G. Santiago. "Incomplete sensitivities for the design of minimal dispersion fluidic channels." Computer Methods in Applied Mechanics and Engineering 192: 4131-4145 (2003).

(Continued)

*Primary Examiner* — Suzanne Lo
(74) *Attorney, Agent, or Firm* — Amy L. Ressing; Kerry L. Broome

(57) ABSTRACT

A computational "toolbox" can be used for the a priori design of optimized fluidic components. These components include a channel under low-Reynolds number, pressure-driven flow, with an arrangement of grooves cut into the top and/or bottom to generate a tailored cross-channel flow. An advection map for each feature (i.e., groove of a particular shape and orientation) predicts the lateral transport of fluid within the channel due to that feature. Applying the advection maps in sequence generates a representation of the outflow distribution for complex designs that combine one or more features. Therefore, the effect of the complex three-dimensional flow field can be predicted without solving the governing flow equations through the composite geometry, and the resulting distribution of fluids in the channel is used to evaluate how well a component performs a specified task. The toolbox is applied to determine optimal combinations of features for specified mixer sizes and mixing metrics.

21 Claims, 10 Drawing Sheets

(56) References Cited

PUBLICATIONS

A.D. Stroock, S.K.W. Dertinger, A. Ajdari, I. Mezic, H.A. Stone, and G.M. Whitesides. "Chaotic Mixer for Microchannels." Science, vol. 295, 647-651, (Jan. 25, 2002).

A.D. Stroock and G.J. McGraw. "Investigation of the staggered herringbone mixer with a simple analytical model." Philosophical Transactions of the Royal Society of London Series A—Mathematical Physical and Engineering Sciences 362, 971-986, (Mar. 11, 2004).

J. Aubin, D.F Fletcher, C. Xuereb. Design of micromixers using CFD modelling, Chemical Engineering Science 60: 2503-2516 (Jan. 2005).

Jing-Tang Yang, Ker-Jer Huang, and Yu-Chun Lin. "Geoemtric Effects on fluid mixing in passive grooved micromixers." Lab on a Chip, 5, 1140-1147 (2005).

Y. Wang, Q. Lin, and T. Mukherjee, "System-oriented dispersion models of general-shaped electrophoresis microchannels." Lab on a Chip 4: 453-463 (2004).

Y. Wang, Q. Lin, and T. Mukherjee, "A model for laminar diffusion-based complex electrokinetic passive micromixers." Lab on a Chip 5, 877-887 (2005).

A.J. Pfeiffer, T. Mukherjee, and S. Hauan, "Design and optimization of compact microscale electrophoretic separation systems." Industrial & Engineering Chemistry Research 43: 3539-3553 (2004).

P.B. Howell, D.R. Mott, S. Fertig, C.R. Kaplan, J.P. Golden, E.S. Oran, and F.S. Ligler, "A Microfluidic Mixer with Grooves Placed on the Top and Bottom of the Channel." Lab on a Chip 5, 524-530 (2005).

T.G. Kang and T.H. Kwon, "Colored particle tracking method for mixing analysis of chaotic micromixers." Journal of Micromechanics and Microengineering 14, 891-899 (2004).

D.R. Mott, C.R. Kaplan, and E.S. Oran, "A Robust Solver for Incompressible Flow on Cartesian Grids with Colocated Variables." NRL Technical Memorandum Report, NRL/MR/6404--05-8858 (2005).

C. Kaplan, D. Mott, and E. Oran, "Towards the Design of Efficient Micromixers." AIAA Paper 2004-931, 42nd AIAA Aerospace Sciences Meeting and Exhibit. Reno, Nevada. Jan. 5-8, 2004.

C. Kaplan, E. Oran, D. Mott and J. Liu, "Computations of Chaotic Flows in Micromixers." 2005 NRL Review, Naval Research Laboratory, NRL/MR/6410--06--8948 (2005).

\* cited by examiner 202    204

NUMERICAL TOOLBOX FOR DESIGN OF FLUIDIC COMPONENTS AND SYSTEMS

BACKGROUND OF THE INVENTION

The present invention is generally directed to fluidic components. A fluidic component in its broadest sense, may be considered a channel that permits flow of fluid therethrough. Non-limiting examples of fluidic components include fluidic mixers, reactors, straws, tubes, etc.

Computational fluid dynamics (CFD) is playing an increasing role in the development of fluidic components, but the automatic design and optimization of new components using CFD is the exception and not the rule. Computational studies of the flow fields within components are more often used to fine-tune a near-final design or provide detailed analysis once a design is finalized. When CFD is used in design, it generally serves to replace some benchtop experiments with numerical experiments, but it leaves the "build-and-test" approach intact. Intuition and experience guide the designer through the arduous process of testing and altering a design until a satisfactory component is produced.

One approach to optimizing a predetermined design starts by defining the geometry using a set of control points, and then moving these points to deform the geometry in an attempt to improve performance. This approach is rare in fluidic applications due to the computational intensity of optimizing complex structures. Some have pursued general shape optimization for microchip electrophoresis. Starting with a bend with consistant inner and outer radii, the shape of the inner wall was adjusted to minimize sample dispersion around the turn. The transport was modeled as two-dimensional electrokinetic flow, and the evolving geometry was modeled in one of two ways: one approach used two parameters to define the shape of the inner wall, and a second discretized the wall using 200 elements. Later work included additional designs that adjusted the shape of the outer wall as well.

A more common approach to design optimization in fluidics is to take an established component and conduct parameter studies using CFD modeling of either the governing flow equations or some reduced, representative model. For example, several studies have examined the effect of varying certain geometric factors in an established herringbone mixer. The complex three-dimensional flow field in a specific herringbone mixer has been approximated using a two-dimensional lid-driven cavity model that was tuned to provide qualitative agreement to experimental data. The effect of varying two geometric parameters was studied: the offset (i.e., the location of the "elbow") in the groove and the number of grooves in each cycle. Others presented CFD results for six mixers, based on the herringbone mixer design obtained by varying the depth and width of the grooves and the number of grooves per cycle. Still others have studied the effects of varying herringbone offset, depth, and angle, as well as the inflow geometry, by applying CFD to nine configurations chosen judiciously to isolate the effects of the various parameters. These studies propose guidelines for improving the initial herringbone design within the envelope defined by the simulations, but they apply only to mixers that repeat the same feature with a periodic change in orientation.

Other authors pursue component-based optimization in which predefined elements are combined to produce a more complicated system, the entirety of which is then studied using conventional CFD equations. Some describe a component-based approach for modeling electrokinetic flow networks. They use analytical models to predict cross-channel diffusion and streamwise dispersion for two elements: straight channels and 90° bends. Models for tapered channels and T-intersections were introduced in later work. Combining these elements gives composite geometries, and the transport of species through the system is predicted by combining the effects predicted by the analytical models. Others have applied these analysis tools for designing separation systems. In addition to straight sections and bends, they include elements for injectors and detectors, and they use heuristic rules for element placement to generate composite systems automatically, which occupy minimal areas. The analytical models used to characterize element performance do not include vertical variation within the channels.

A key parameter for characterizing viscous flow is the Reynolds number, Re, defined as $$Re = \rho v L/\mu \tag{1}$$

where $\rho$ is the density, $v$ is the characteristic velocity, $L$ is the length scale and $\mu$ is the viscosity. The Reynolds number measures the relative importance of inertial effects to viscous effects. Some fluidic systems operate at low Reynolds numbers, which also means that the fluid transport through the components is laminar. For some aqueous fluidic systems, Re is often sufficiently low that the inertial terms in the Navier-Stokes momentum equation are negligible compared with the viscous and pressure-gradient terms. Therefore, the Stokes equations can be used to characterize the flow. Assuming Stokes flow also ensures that a component will perform as designed if further miniaturization is pursued. A mapping strategy in accordance with an exemplary embodiment of the present invention and described below does not require this assumption, however, and the implications of including the inertial terms are discussed further below.

An analyte i present in the fluid moves through a component due to advection and diffusion, $$\frac{\partial \rho_i}{\partial t} = -u \cdot \nabla \rho_i + D_1 \nabla^2 \rho_i, \tag{2}$$

with the concentration and diffusion coefficient for analyte i denoted by $\rho_i$ and $D_i$, respectively: u is the velocity vector. Equation (2) assumes there are no sources or sinks of $\rho_i$. A number of different analytes may be present in the sample, so the subscript i varies between 1 and the number of analytes. Species that obey equation (2) are known as conserved scalars because their transport can redistribute the species within the channel but not change the total amount present. Unless the species is present in concentrations high enough to affect the fluid viscosity $\mu$, the species can be treated as a passive scalar: the velocity field can be determined independently of the species distributions, and then the species distributions can be solved after the velocity field is determined.

In many situations, such as in the exemplary embodiments discussed below, advection is assumed to be the dominant transport process and diffusive transport is therefore neglected. This assumption is reasonable for many microfluidic systems and applications, such as the exemplary embodiments discussed below, but is not necessary. In the situations where diffusive transport is neglected, the last term in equation (2) may be dropped and the advection alone may be feature of focus. Integrating along a streamline dx/dt=u gives $$\rho_i = \text{constant along} \frac{dx}{dt} = u. \quad (3)$$

in other words, in the absence of diffusion, analytes flow along streamlines through the component.

In addition to describing the flow of a continuous variable such as the concentration of a species, the streamline dx/dt=u also gives the path of particles that travel at the local fluid velocity. A number of authors have used the transport of these "passive particles" to characterize the flow fields in microfluidic components, particularly mixers. A conventional approach includes releasing a number of particles upstream in the component, and examining the distributions of the particles in the cross-section at the component exit. This is the same concept as generating a Poincaré map to quantify the quality of mixing.

The following example focuses on an exemplary channel containing a single, isolated exemplary feature, and it demonstrates the characteristics of the flow that. This characteristic makes an aspect of the present invention effective, as discussed in further detail below. The channel has width w and height h, with w/h=3.11.

Consider channel 100 in FIGS. 1A and 1B with a feature that is a single diagonal groove 102 cut into channel floor 104. The width of groove 102 is w/4, the depth is 0.42h, and groove 102 runs across the channel at a 45° angle from sides 106 and 108. Solving the steady Stokes momentum equation $$\nabla p = \mu \nabla^2 u, \quad (4)$$

subject to the mass conservation constraint for incompressible flow, $$\nabla \cdot u = 0, \quad (5)$$

produces the velocity field u, where μ is the viscosity and p is the pressure. A zero-slip velocity boundary condition is assumed, so u=0 on all surfaces. The zero-slip assumption has been validated experimentally for the pressure-driven flow of water in channels as small as 40 nm. The computational grid extends far enough upstream and downstream from groove 102 to ensure that a fully developed velocity field approaches groove 102, and that the velocity returns to this fully developed profile after passing groove 102.

The flow through channel 100 was found by solving equations (2), (4) and (5) using a finite-volume incompressible flow solver for complex geometries, which includes an option to remove the inertial terms from its full Navier-Stokes solver in order to model Stokes flow. As illustrated in FIG. 1B, water enters channel 100 carrying two different dyes (light on the right 110 and dark on the left 112), and the three cross-sections 114, 116 and 118 show the distribution of these dyes at various points in channel 100. Streamline 120 in FIG. 1B follows the transport of light fluid originating at point A through to the downstream location at point B. As streamline 120 indicates, fluid that encounters upstream end 122 of the groove 102 goes into groove 102 and crosses to side 106. The result at exit plane 118 is a new dye distribution.

The dye distribution at exit plane 118 in FIG. 1B can be determined efficiently using a particle-tracking method. Passive particles of unknown color are distributed uniformly in exit plane 118. A streamline passing through each particle is traced upstream to the point where each particle entered the component, and that inflow location determines the color of each particle. FIG. 2 demonstrates this approach for the geometry in FIGS. 1A and 1B.

For Stokes flow, some flow properties, such as the pressure drop across the component, scale with flow rate, component size, and viscosity. The scalar distributions seen in planes 114, 116 and 118 in FIG. 1B are invariant—these are valid for any combination of geometry and flow conditions that satisfy the assumption of Stokes flow, given the inflow condition of two separate streams. Previous work demonstrated independence of the flow in mixing components below Re=10. For comparison, if w=1000 μm, water at 25° C. flowing at 0.1 mL min$^{-1}$ through this geometry gives Re~3.

FIG. 3 shows a projection of the entire streamline 120 in FIG. 1B onto exit plane 118 of the channel. The projection travels from point A, down into the groove, and out again, finally intersecting point B. The straight line going from A to B is the net effect of this transport. As was noted above, the inflow dye distribution and the coordinates of point A are sufficient to determine the fluid color at point B—the detailed shape of the streamline is not needed after the location of point A has been determined.

As shown by streamline 120 in FIG. 1B, the effects of groove 102 on the velocity field do not reach far upstream or downstream from groove 102. Streamline 120 follows the steady-state, parallel flow down channel 100 as it approaches groove 102 and then abruptly turns down into groove 102. After exiting groove 102, streamline 120 turns quickly to point directly down channel 100 parallel to the wall 106. This localized effect of groove 102 on the velocity field is a consequence of the insignificance of inertial terms in Stokes flow, and this effect has been observed for Navier-Stokes calculations at low Reynolds numbers. This effect is quantified in FIG. 4, which shows the deviation of the x velocity component from the steady-state distribution for channel 100 in the neighborhood of groove 102. Groove 102 extends from x/w=0 to x/w=1 in this plot. FIG. 4 shows root-mean-square values of the velocity deviation, defined as $$\text{RMS} = \sqrt{\frac{\sum_{i=1}^{ncells} \left(\frac{u_i - U_i}{u_{norm}}\right)^2}{ncells}} \quad (6)$$

At each station along the channel, a grid of 64×22 cells was used in the velocity calculation, and in each cell, i, the steady-state x-velocity $U_i$ (i.e., the velocity that cell would have if groove 102 were not there) is compared with the local x-velocity $u_i$. This difference is squared and summed for all ncells=1408 in the cross-section to give a measure of how far the local distribution is from the steady-state distribution. The velocity $u_{norm}$ is used to normalize the deviation. Higher, solid curve 402 in FIG. 4 uses $U_i$ in each cell to normalize the difference for that cell, and lower, dashed curve 404 uses the mean velocity in channel 100 to normalize the difference for all cells. Normalizing by $U_i$ leads to a larger measure of the deviation because $U_i$ in cells near the edges of channel 100 are very small; an increase in the velocity at these locations due to groove 102 leads to a large normalized difference.

In addition to the maximum deviation from steady-state, of interest is how far from groove 102 the effects of groove 102 reach. Approaching groove 102, the flow field stays within 1% of its steady-state velocity distribution as close as w/2 from upstream end 122 of groove 102. The flow then returns to within 1% of the steady-state distribution within a distance w/2 downstream from groove 102. Therefore groove 102 significantly alters the velocity field only in a very tight region immediately in front of and behind it. As the profile of fluid distribution in FIG. 1B demonstrate, however, once groove 102 redistributes the scalars in the fluid, this new distribution persists downstream of groove 102, frozen by the parallel steady-state flow.

BRIEF SUMMARY OF THE INVENTION

It is object of the present invention to provide a fluidic designing system and method that optimizes parameters based on predefined metrics.

The present invention is generally drawn to a fluidic designing system and method that uses a priori information related to fluid-affecting features.

A goal of the present invention is to replace the empirical approach to fluidic design with an automated approach based on pre-specified performance criteria. Exemplary components in accordance with an embodiment of the present invention and described herein are based on a rectangular channel with some sequence of features. e.g. some arrangement of grooves cut into the top, bottom, or both, to generate a tailored secondary flow. Using an automated design process, the designer specifies the task to be performed (such as mixing two incoming streams, delivering analyte to a particular point on a sensor surface, a particular output profile, or eliminating the depletion layer or thermal boundary layer near a wall) and general rules about the component layout (such as a maximum number of features or a requirement that the feature pattern repeat). A design toolbox in accordance with an exemplary embodiment of the present invention then determines the optimal combination of features to perform the required task subject to the specified constraints.

In one aspect of the invention, a method comprises establishing an input fluid profile, establishing an output fluid profile and then creating a fluid flow map relating the output fluid profile to the input fluid profile. The input fluid profile relates to a fluid flowing in a direction through the channel and corresponds to a disposition of the fluid at an input surface within the channel. The output fluid profile corresponds to a disposition of the fluid at an output surface within the channel and is disposed at a distance from the input surface in a direction of the fluid flow.

In an exemplary optimization strategy in accordance with an exemplary embodiment of the present invention, the output fluid profile generated by one feature in isolation is determined by solving the governing fluid dynamics equations numerically, and then the result is distilled into an advection map that projects a conserved scalar field (such as a tracer species) across the feature. The distribution of fluids or analytes within the channel is altered as the fluid flows past a feature, and the advection map gives the distribution downstream of the feature based on the inflow distribution. The transport across multiple features can be predicted by applying the appropriate maps sequentially. By restricting the design to combinations of specified features and producing the map for each of these features a priori, the time required to evaluate each design is reduced by several orders of magnitude compared with solving the fluid dynamics equations through the composite geometry. An exemplary toolbox may then evaluate the performance of each candidate design using metrics for the specific task and determine which combination of features performs the task better than all other feature combinations.

Additional objects, advantages and novel features of the invention are set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and form a part of the specification, illustrate an exemplary embodiment of the present invention and together with the description, serve to explain the principles of the invention. In the drawings.

DETAILED DESCRIPTION OF THE INVENTION

In the exemplary embodiments discussed below, the channel is linear and has a rectangular cross section. Of course any shaped channel may be used, so long as the CFD equations may be used, or experiments may be taken, to establish the a priori information on the fluid flow therein. Further, the exemplary embodiments discussed below include grooves to affect fluid flow. Of course any fluid flow-affecting feature may be used, so long as the CFD equations may be used, or experiments may be taken, to establish the a priori information on the fluid flow thereabout. Non-limiting examples of fluid flow-affecting features include bumps, fins, areas of differing surface texture, areas having fields, and areas having gradients. Still further, the exemplary embodiments discussed below include planar input and output fluid profiles. Of course any surface may be used for a fluid profile, so long as the CFD equations may be used, or experiments may be taken, or some other method used to establish the a priori information on the fluid flow therethrough. Additionally, the exemplary embodiments discussed below employ pressure-driven flow, but any fluid-driving mechanism may be used. Non-limiting examples of fluid driving mechanisms include gravity and electroosmosis.

Creation of an advection map in accordance with exemplary embodiments of the present invention will now be discussed.

Figure 3:
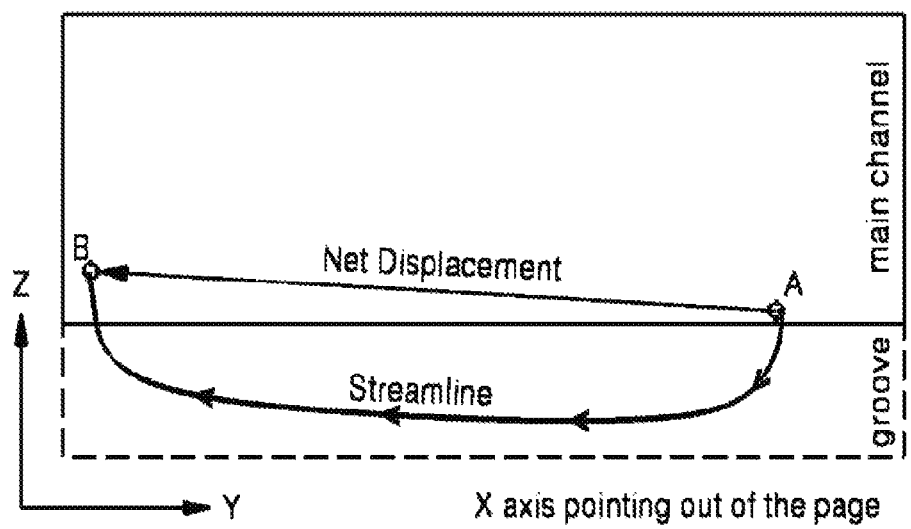
FIG. 3 illustrates and end view of a streamline in FIG. 1(b)
Figure 5:
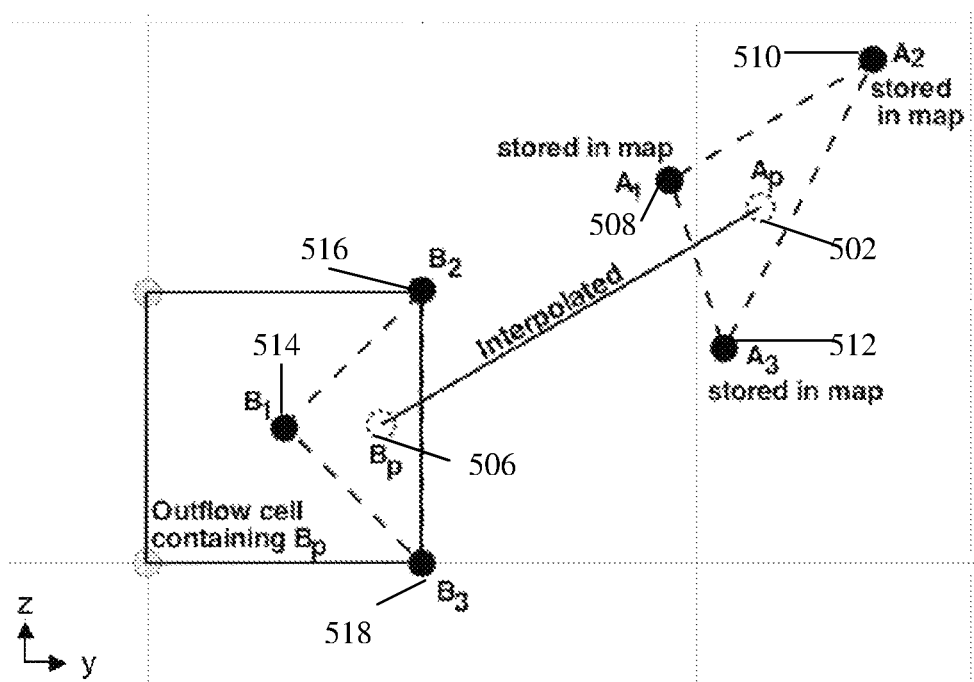
FIG. 5 is a schematic of interpolation within an advection map in accordance with an exemplary embodiment of the present invention.

An advection map is a summary of the fluid transport past a feature: it stores the inflow locations for a set of points in an outflow surface. Interpolation between the points that are stored in the map provides the inflow coordinate for an arbitrary outflow point. Consider the schematic in FIG. 5. This is the end-view of a component similar to the view given in FIG. 3, but the projection of a streamline is not included. The origin 502 for streamline intersecting point 506 is needed, but the map stores only the upstream coordinates of points at the corers and centers of the Cartesian grid. Three points 514, 516 and 518 in the exit plane, and the corresponding upstream points 508, 510 and 512 in the entrance plane, are stored in the map. The location of 502 is interpolated using the known points. The coordinates of 506 can be expressed as a weighted average of the coordinates of 514, 516 and 518

$$y_{BP} = \alpha y_{B1} + \beta y_{B2} + (1-\alpha-\beta) y_{B3} \qquad (7)$$

$$z_{BP} = \alpha z_{B1} + \beta z_{B2} + (1-\alpha-\beta) z_{B3} \qquad (8)$$

Since the coordinates in equations (7) and (8) are known, these equations can be solved for the weights $\alpha$ and $\beta$. Then the coordinates of point 502 can be calculated:

$$y_{AP} = \alpha y_{A1} + \beta y_{A2} + (1-\alpha-\beta) y_{A3} \qquad (9)$$

$$z_{AP} = \alpha z_{A1} + \beta z_{A2} + (1-\alpha-\beta) z_{A3} \qquad (10)$$

Thus equations (7) and (8) are solved for $\alpha$ and $\beta$, and then equations (9) and (10) are used to determine the origination point 502 for streamline passing through point 506. Note that the value of the conserved scalars (i.e., the dye color in the previous example) are not interpolated at the points 508, 510, and 512 to give an average value. For example, if 510 lies in the region that is initially red but 508 and 512 are blue, the color assigned to 506 is not purple. The coordinate location for 502 is calculated, and then it is determined whether 502 lies in the blue region or the red region. The appropriate color is then assigned to point 506.

In this exemplary embodiment, one flow property may be interpolated using the map: the transit time across the feature. In addition to the coordinates of the corresponding points 508, 510 and 512, each point 514, 516 and 518 in the map also stores the time, $t_i$, required to traverse each corresponding streamline moving at the local velocity. The transit time between $A_p$ and $B_p$, denoted as $t_p$, is calculated using the same weights as above:

$$t_P = \alpha t_1 + \beta t_2 + (1-\alpha-\beta) t_3 \qquad (11)$$

The transit time appears in some metrics used to grade component performance (such as in characterizing dispersion), but some mixing metrics consider only the spatial distribution of the species in the cross section. When the transit time is used, it requires scaling for the length scale and flow rate of a particular application.

Therefore, an advection map for a feature is a transformation $T(y_B, z_B) \rightarrow (y_A, z_A)$ if the transit time is not included and $T(y_B, z_B) \rightarrow (y_A, z_A, t)$ if it is. It is implemented by storing a collection of points $\{B_i\}$ downstream from a feature and the corresponding points $\{A_i\}$ upstream from the feature that share streamlines with these downstream points, and implementing a procedure for interpolating the upstream location that corresponds to a general downstream location. In an exemplary embodiment of the present invention, the points in the map for each feature include the corners and centers of cells in a 64×22 rectangular grid spanning the channel. The map is specific to a channel cross-section (both width to height ratio and size relative to the feature), but a map can be generated regardless of the shape of the channel cross-section or even for a channel with different inflow and outflow shapes. If the flow entering and exiting the feature exhibits the steady-state velocity distribution at those locations, then the map can be defined.

In an exemplary embodiment of the present invention, the map for a particular feature in a particular channel can be applied to any geometry which matches that layout, regardless of scale, provided the flow conditions satisfy the Stokes flow assumption. If the transit time is included in the map, then it should be scaled using the specific flow rate and length scale of a particular design, but the map still gives all the information needed to characterize the feature. This mapping approach can characterize advection at Reynolds numbers beyond the Stokes regime provided Re is low enough for the flow to remain laminar. Options for addressing the higher Re case are discussed below after the design approach for complex components is presented.

Designing composite components in accordance with an exemplary embodiment of the present invention will now be discussed.

Figure 6A:
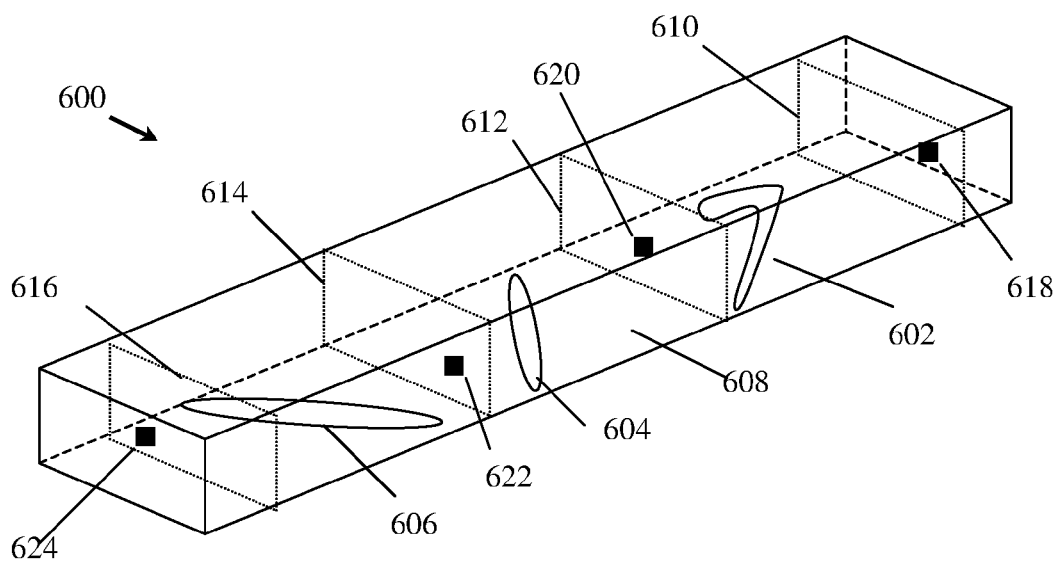
FIG. 6(a) illustrates a channel with three grooves cut into the bottom.

Consider a channel that includes three features in sequence as illustrated in FIG. 6A. In the figure, channel 600 has a bottom 608 that includes three features—groove 602, groove 604 and groove 606. Plane 610 corresponds to the input surface for groove 602. Plane 612 corresponds to the output surface for groove 602 and the input surface for groove 604. Plane 614 corresponds to the output surface for groove 604 and the input surface for groove 606. Plane 616 corresponds to the output surface for groove 606.

Figure 6B:
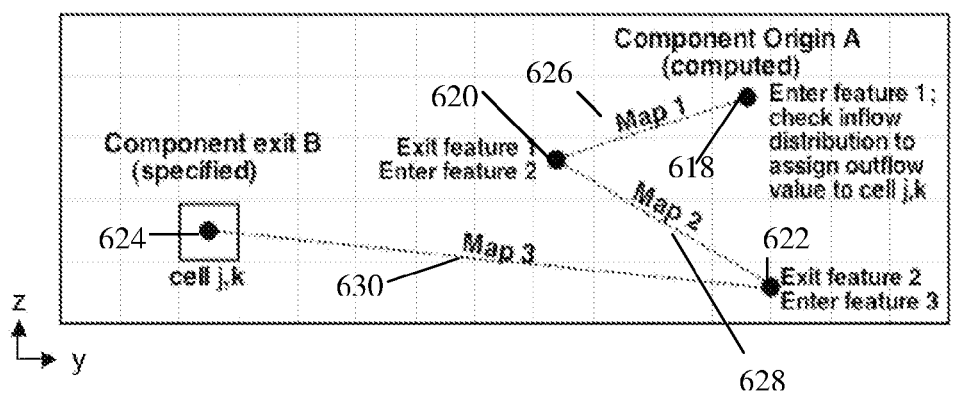
FIG. 6(b) is a schematic of combining maps in sequence to determine a relation to an inflow location to an outflow location of the channel of FIG. 6(a)

FIG. 6B demonstrates how to determine the outflow species distribution for the composite geometry of FIG. 6A, using the maps for each feature. The features, which are groove 602, 604 and 606, are numbered 1, 2 and 3, respectively, going from upstream to downstream through channel 600. Maps 626, 628 and 630, relate the input fluid profile to the output fluid profile for these features, respectively. In the figure, the dotted lines represent net displacement of fluid as compared to an input and output fluid profile as determined by a corresponding map. Given the inflow distribution of species entering the component, an exemplary embodiment of the present invention is able to compute the outflow distribution using maps 626, 628 and 630. The outflow distribution is obtained by specifying the values at cell-centers of some grid in outflow plane 616, such as point 624 in FIG. 6B. This grid need not be the same 64×22 grid used by the maps, and in general a finer grid is used for increased resolution. Given the coordinates $(y_B, z_B)$ of point 624 within surface 616, map 630 for feature 606 is taken in the sequence, to determine the coordinates ($y_2, z_2$) of point 622 within surface 614, the location upstream from feature 606 on the streamline that passes through B. This location is also the outflow location for feature 604, and map 628 for this second feature is then used to determine the coordinates ($y_1, z_1$) of point 620 within surface 612. Coordinates ($y_1, z_1$) are the coordinates where this streamline entered feature 604. Finally, map 626 is used to determine the coordinates ($y_4, z_4$) of point 618 within surface 610 of this streamline when it entered feature 602 (or in this case channel 600). The value assigned to point 624 is that of the inflow distribution at point 618.

The procedure can be used to characterize the flow through components that combine an arbitrary number of features. Again, no averaging of the species values is done. Furthermore, scalar distributions at the intermediate planes between features within the components are not calculated unless they are needed to evaluate the performance of the composite component.

Figure 4:
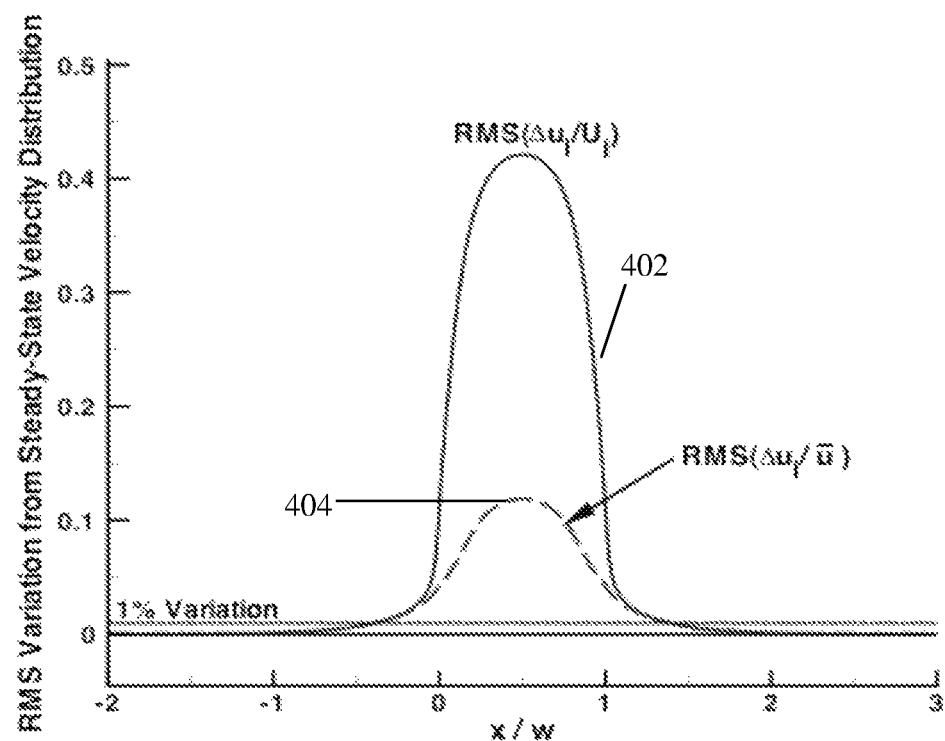
FIG. 4 is a graph illustrating a variation from the steady-state velocity distribution in the channel of FIG. 1(b) as the fluid passes the diagonal groove.

The spacing between consecutive features in a composite design may be a potential issue: each map assumes that the feature corresponding thereto is acting in isolation, so spacing features too close together can produce interaction effects between consecutive features and alter the overall transport. As illustrated in FIG. 4, the effects of a feature do not extend very far along the channel, and experimental results included below indicate only minimal changes in the advection patterns when features are placed in very close proximity. The effect of feature spacing was studied experimentally and is discussed later.

This procedure for rapidly determining the transport through a complex component can be applied to flows at Reynolds numbers beyond the Stokes flow regime provided the flow is still steady and laminar. If the maps are to model flow at a consistent value of Re, then a collection of maps can be generated at that specific Re. If the Reynolds number is not fixed, then a series of advection calculations must be performed and the Reynolds number becomes a parameter in the interpolation scheme. Additionally, the effects of a feature on the velocity distribution would persist further downstream from a feature than in the Stokes regime, such that feature spacing may need to be expanded to ensure good agreement between the model predictions and the component performance. To comprehend the value of the present invention over conventional systems, consider that solving the governing flow equations for a composite geometry using traditional CFD would require an approximate increase of time on the order of $10^5$ than would be required using the advection mapping system and method in accordance with the present invention.

Since the characterization of the advection patterns in a complex component can now be done rapidly, metrics are needed to evaluate the performance of a potential component so that design optimization can be automated. Once metrics have been defined, the user can specify the number of features in the library and how they are to be combined to form a component, then run through the viable options and use the metric to grade each design on how well it performs a certain task. Brute-force interrogation of every possible combination can be carried out for moderately-sized components, or optimization approaches such as genetic algorithms can be applied. Selected results for mixers found using the former approach are discussed below.

Determining optimal mixers in accordance with exemplary embodiments of the present invention will now be discussed. Exemplary embodiments of the present invention discussed below employ an exhaustive search of candidate designs to design components with optimal performance. However, any approach to optimization may be used.

Figure 7:
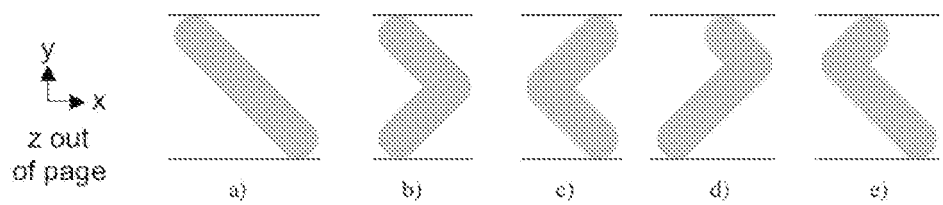
FIGS. 7(a)-(e) are exemplary one-sided features for use in a channel in accordance with an exemplary embodiment of the present invention.

An exemplary toolbox was used to produce optimal mixers with one-sided features (i.e., grooves only in the bottom of the channel) and two-sided features (i.e., grooves in both the top and bottom of the channel). FIGS. 7(*a*)-(*e*) show the five one-sided features that the toolbox could use in constructing the one-sided mixers. The bend in the herringbone-shaped grooves in FIGS. 7(*d*) and 7(*e*) is located at y=2w/3. A reflection across the channel (i.e., across the x-z plane) of the diagonal groove (FIG. 7(*a*)) and the two herringbone-shaped grooves (FIGS. 7(*d*) and 7(*e*)) adds three feature options, which gives a total of eight distinct options for each feature in a design.

Figure 1A:
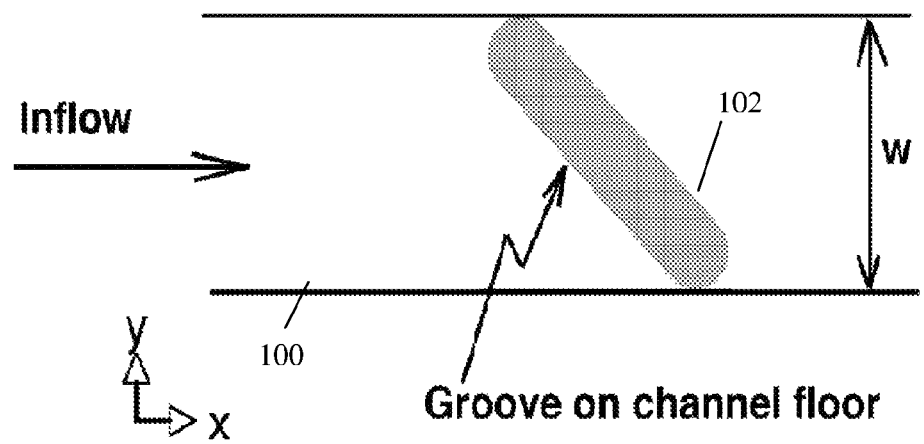
FIG. 1(a) illustrates a channel with a single diagonal groove cut into the bottom.
Figure 1B:
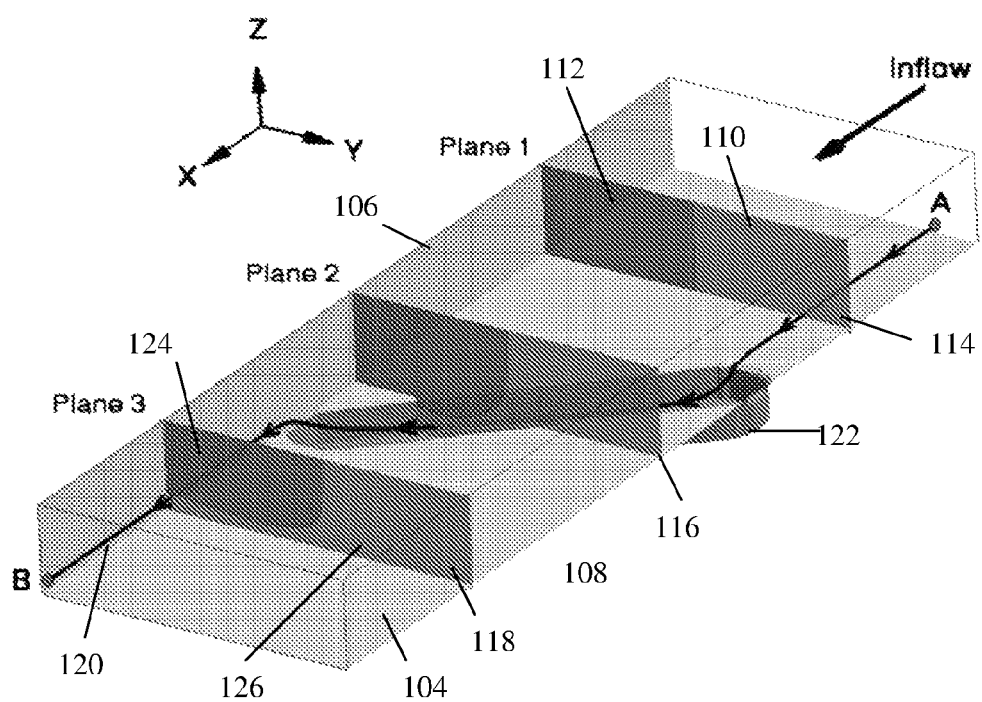
FIG. 1(b) is a perspective plot showing the distribution of two species at three planes of the channel of FIG. 1(a)

The mixer layout was specified as four sets of six features each, giving a mixer of 24 features total. Each set repeats the same 6 features but alternates their orientation; the second set is identical to the first set mirrored across the x-z plane. The design therefore has six degrees of freedom because choosing the first six features specifies the remaining 18 features. The designs presented below are optimal for this prescribed pattern and not for an arbitrary arrangement of 24 features. This layout is compatible with a prior art herringbone mixer, which employs the feature in FIG. 7(*e*) and its reflection, although the depth of the grooves is deeper here than in the prior art design. Each of these 6 features can be any of the 8 options defined by the library, which gives a total of $8^6=262,144$ possible designs. Two streams entered the component side-by-side, in a manner similar to 114 of FIG. 1, and the toolbox identified the optimal designs for two metrics (designated Metric 1 and Metric 2 and defined below) by considering all 262,144 candidate designs. The toolbox eliminated some designs without evaluating their outflow distributions based on a simple set of rules for identifying inefficient or redundant designs.

For example, two consecutive diagonal stripes of opposite orientation produce zero net transport across the channel, so the toolbox eliminated designs that included such combinations. Running on one 400 MHz IP35 processor of an SGI Origin 3400, the toolbox required approximately 8 hours total to complete an exhaustive search of the possible designs and find the optimal designs discussed below for both metrics. Improvements to the software implementation have reduced that time to approximately 2 CPU hours. Running in parallel on 16 processors of an SGT Altix, this optimal result is achieved in about 10 minutes. If conventional CFD were used instead of the advection maps in accordance with the present invention to characterize the transport through these components, the 10-minute search is estimated to be a required three years.

The two metrics introduced here provide practical measures of mixing, and the strengths and weaknesses of these metrics are discussed below. The goal in developing the metrics was to identify mixers that would be effective given the small amount of diffusion that occurs in fluidic components.

Each optimal design was fabricated in PMMA with w=3.175 mm, and tests were performed by flowing a high-viscosity fructose solution through each mixer. The viscosity, scale, and flow conditions combined to give Re~1, and the flow rate was varied up to Re~10 to confirm that the lateral transport was independent of Reynolds number. A fluorescent dye was added to the fluid flowing into the left half of the channel, and the exit plane of the component was imaged using a laser sheet perpendicular to the channel axis. These cross-sections are compared with the predictions provided by the toolbox.

A first exemplary Metric for a one-sided fluidic mixer, and its optimal design in accordance with the present invention, will now be described.

Figure 8A:
FIG. 8(a) is an exemplary channel having features therein in accordance with an exemplary embodiment of the present invention.
Figure 8B:
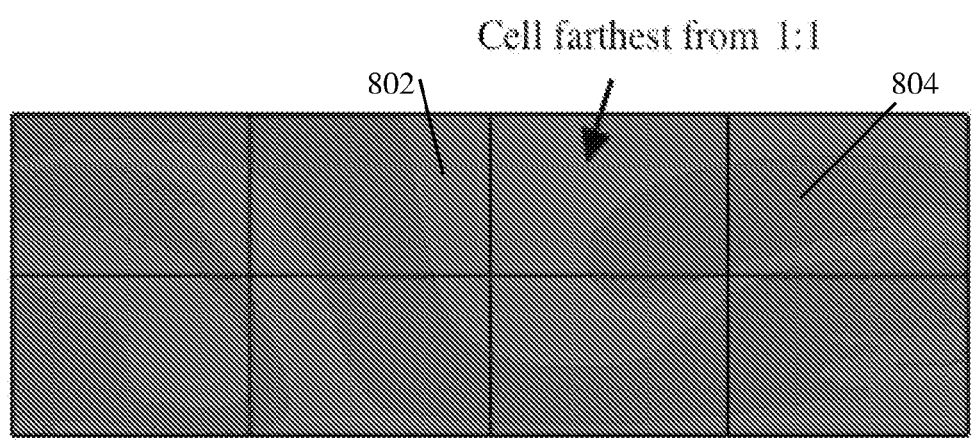
FIG. 8(b) is a computational prediction of dye distribution at the output of the channel of FIG. 8(a)

FIG. 8(a) shows the first 12 features of the optimized mixer for Metric 1, and FIG. 8(b) shows the toolbox's prediction of the outflow dye distributions having two dyes, referred to as fluid 802 and fluid 804, for the full 24-feature mixer. Metric 1 measures the ratio of light and dark fluid passing through each of the 8 coarse cells in FIG. 8(b). A perfect mixer would pass equal amounts of fluid 802 and fluid 804 through each coarse cell. The overall score for a candidate design for Metric 1 is the score of the coarse cell farthest from the perfect mixer score of 1:1. The optimal design determined has an overall score that is closest to the perfect mixer ratio. A variety of coarse grids were tested for this metric. Grids with more, smaller cells resulted in at least one cell filled with only one fluid, such that every design was rated equally poor. Coarse grids with fewer cells identified many designs with a worst cell close to 1:1, such that no one design was clearly best. For an arbitrary optimization run, this metric can be calculated on several grids simultaneously, and the most informative grid for the library size and component length can be identified after the calculation.

The optimal design for Metric 1 matches the prior art mixer, with a set of 6 herringbone structures pointing upstream with the same offset (i.e., the point in the herringbone is on one side of the channel), followed by a set offset to the other side. The cell farthest from a 1:1 ratio for this design has a ratio of approximately 2.45:1 for light to dark. This ratio is better than the worst cell in every other candidate design given the choice of potential features and layout requirements. Since the distribution within each coarse cell does not affect the metric, the development of fine structures within the distribution is not favored. The ratios in the other cells in FIG. 8(b) range from 1.06:1 to 1.35:1, indicating good mixing based on Metric 1, but the two fluids in these cells are not interspersed well. Islands of each fluid overlap adjacent cells leaving large, unmixed regions.

A second exemplary Metric for another one-sided fluidic mixer, and its optimal design in accordance with the present invention, will now be described.

Figure 2:
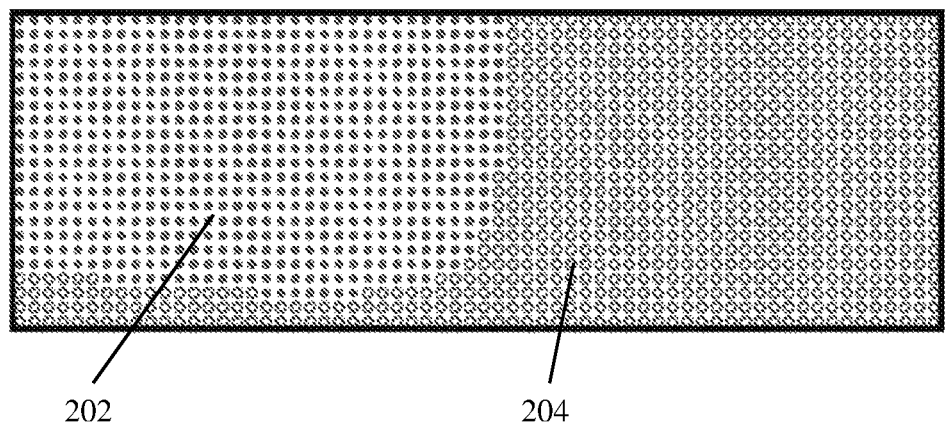
FIG. 2 illustrates particle distribution at an exit plane of the perspective plot of FIG. 1(a)

Metric 2 provides a measure for mixing that is independent of the initial species distributions, and FIG. 9 shows results for the optimal 24-feature mixer for Metric 2. To define Metric 2, consider a grid of particles similar to that in FIG. 2; particles are placed in the outflow plane of the component at the cell centers of a 64×22 Cartesian volume grid. Defining "neighbors" as particles in adjacent cells, effective mixers redistribute the fluid such that particles that enter the component far apart become neighbors in the outflow. Metric 2 takes points that become neighbors in the outflow and calculates the distance separating them when they enter the component. This distance is approximated by comparing the (j,k) indices of the cells that the particles intersected when they entered the component. For example, if two particles in adjacent cells at outflow entered the component through cells (4,7) and (5,2), then the distance between them at inflow is scored as |4−5|+|7−2|=6. Each particle, therefore, has an average distance between it and its neighbors, and Metric 2 is the root mean square of this distance for the 64×22 arrangement of particles in FIG. 2. The layout shown in FIG. 9(a) maximizes Metric 2. This optimal design alternates herringbone and chevron structures pointing downstream. The offset for the herringbone features is constant for the set of 6 features and then switches for the next set of 6 features. This design produces outflow neighbors that average 12.6 cells of separation at inflow.

Figure 9A:
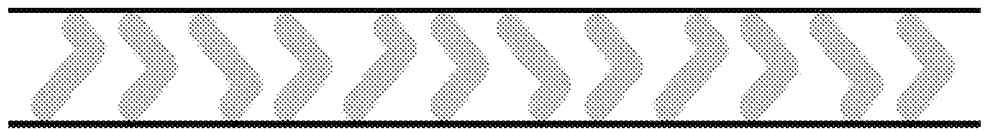
FIG. 9(a) is an exemplary channel having features therein in accordance with another exemplary embodiment of the present invention.
Figure 8C:
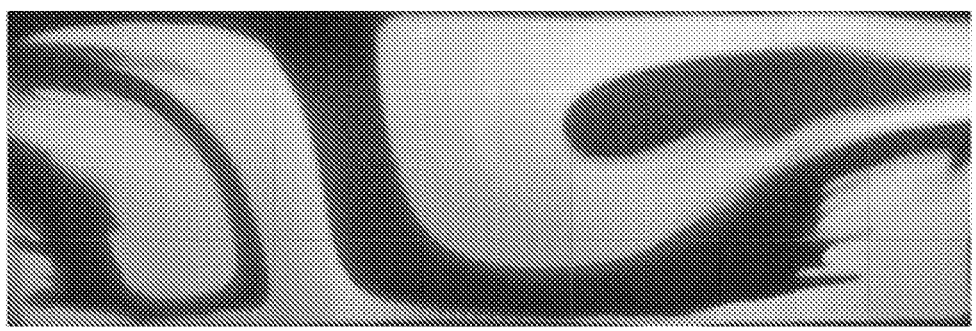
FIG. 8(c) is an experimental result of dye distribution at the output of the channel of FIG. 8(a), wherein the features are widely spaced.
Figure 8D:
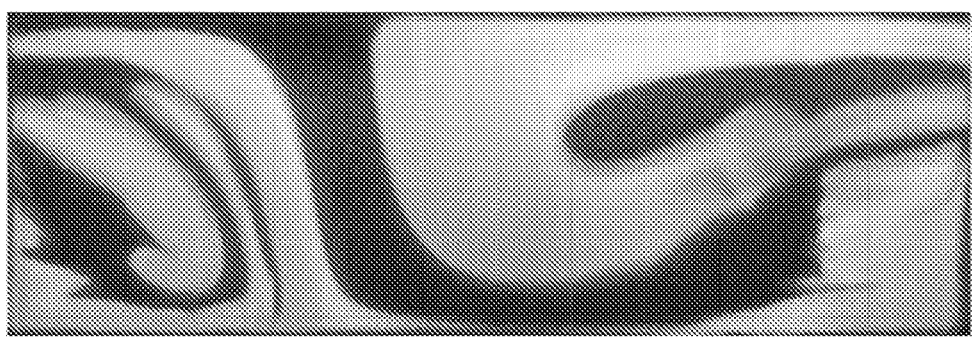
FIG. 8(d) is an experimental result of dye distribution at the output of the channel of FIG. 8(a), wherein the features are narrowly spaced.
Figure 9B:
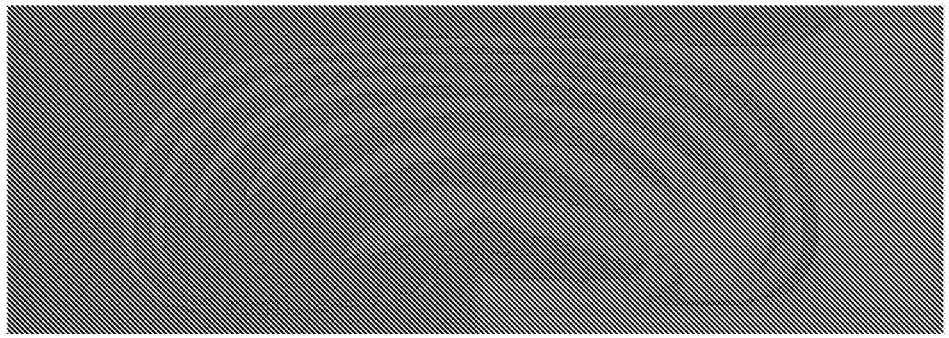
FIG. 9(b) is a computational prediction of dye distribution at the output of the channel of FIG. 9(a)

FIG. 9(b) shows the predicted outflow distribution of the two species entering the optimal mixer. Although Metric 2 does not depend upon the species distributions at inflow FIG. 9(b) takes the same two-fluid inflow studied in FIG. 8. Alternating the chevrons and herringbones generates fingering between the two fluids along the channel center line that is stretched and distorted as more cycles are added. Comparing FIGS. 8(b) and 9(b) shows that the Metric 2 mixer generates more fine features than the Metric 1 mixer but leaves the corners of the channel largely unmixed. Metric 1 ranks the design in FIG. 8 above the design in FIG. 9 due to these unmixed regions near the corners and the walls. However, more fluid moves through the mixer near the center of the cross-section than in the areas near the walls, and the design for Metric 2 mixes this core region well.

Experimental validation and effect of feature spacing will now be discussed.

FIG. 8(c) shows the experimental results for the Metric 1 mixer with consecutive features spaced roughly w apart. This spacing is measured from the downstream end of one feature to the upstream end of the next feature. The toolbox assumes that consecutive features act independently, and FIG. 4 suggests that this spacing is large enough to satisfy that assumption. The agreement between FIGS. 8(b) and 8(c) is excellent. The toolbox under-predicts the transport slightly, but the experiment reproduces the structures predicted by the computation.

FIG. 8(d) shows the experimental outflow distribution for a compact mixer with the same combination of features spaced closer together. Consecutive features in the compact mixer are spaced w/2 apart measured from the upstream edge of each feature. The herringbone grooves measure 2w/3 from upstream to downstream edges, so this compact spacing results in nesting (overlap) of consecutive features. FIG. 8(d) is slightly different from FIG. 8(c), but the two results are very similar, indicating that the toolbox characterizes the flow well even when features are tightly spaced.

Figure 9C:
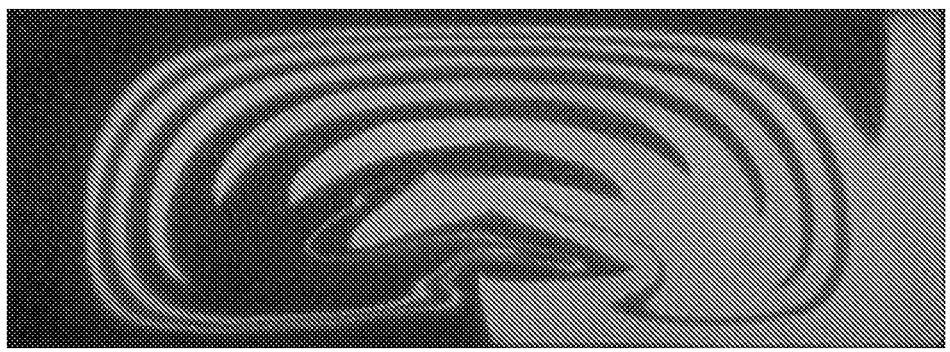
FIG. 9(c) is an experimental result of dye distribution at the output of the channel of FIG. 9(a), wherein the features are widely spaced.
Figure 9D:
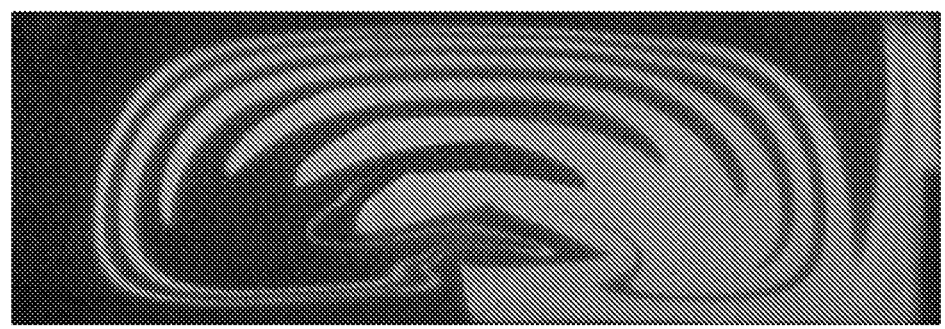
FIG. 9(d) is an experimental result of dye distribution at the output of the channel of FIG. 9(a), wherein the features are narrowly spaced.
Figure 10:
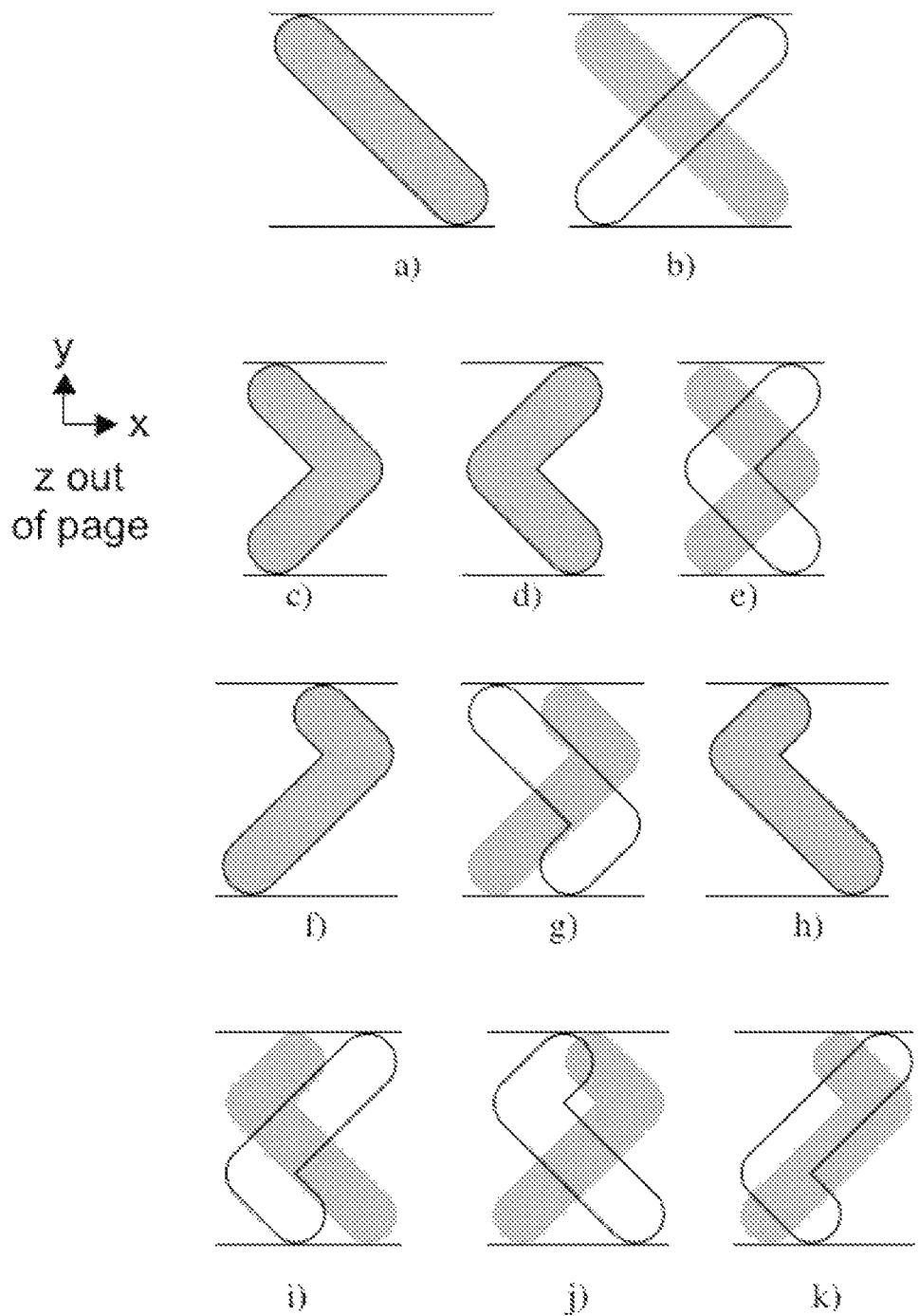
FIGS. 10(a)-(k) are exemplary two-sided features for use in a channel in accordance with an exemplary embodiment of the present invention.

FIGS. 9(c) and 9(d) show experimental results for the optimal feature combination for Metric 2 with wide feature spacing and with compact feature spacing as defined above. Similar to the mixer in FIG. 8, changing the feature spacing alters the species distributions slightly, but the toolbox still does an excellent job predicting the outflow distributions of the species for both experimental cases.

The above-described exemplary Metrics and their respective optimal designs in accordance with two-sided fluidic mixers in accordance with exemplary embodiments of the present invention, will now be described.

Optimal mixers with grooves cut into the top and bottom of the channel were also designed using the toolbox. For the one-sided case, the terms "feature" and "groove" were largely synonymous, but for the two-sided case, the term "feature" strictly refers to a combination of two grooves that are cut into the top and bottom of the channel at the same x location. The library of available two-sided features for an exemplary embodiment of the present invention is shown in FIGS. 10(a)-10(k). The features are limited to combinations of the same type of groove (such as a chevron on both the top and bottom of the channel), but the orientation of the top and bottom grooves (such as the direction each chevron is pointing or to which side the herringbone is offset) varies. Reflections of some features across the x-y plane or the x-z plane produce additional distinct features, giving a total of 24 options for each feature in the mixer. The mixer layout was specified as four sets of four features each, giving a mixer of 16 features total. As with the one-sided mixer design, the sets of 4 features alternate in orientation: the second set is identical to the first set mirrored across the x-z plane. The toolbox tested the resulting 331,776 possible combinations for these features and determined the optimal sequence for each of the two metrics described above for the one-sided mixers. The number and length of candidate designs determines the run time of the optimization code, so practical considerations limit the size of the library and the number of degrees of freedom allowed in the design. The run time for the case described here is comparable to the 8 hours required for the single-side mixer optimization. Adding a fifth feature to the feature set would increase the run time by a factor of approximately 25.

Figure 11A:
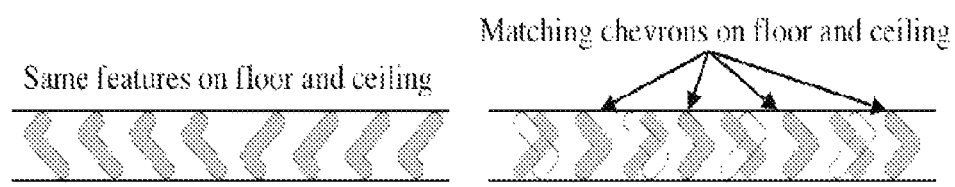
FIG. 11(a) are exemplary channels having feature pairs therein, respectively, in accordance with exemplary embodiments of the present invention.
Figure 11B:
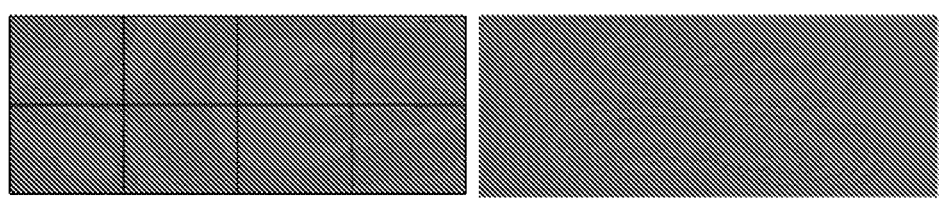
FIG. 11(b) are computational predictions of dye distribution at the outputs of the channels of FIG. 11(a)
Figure 11C:
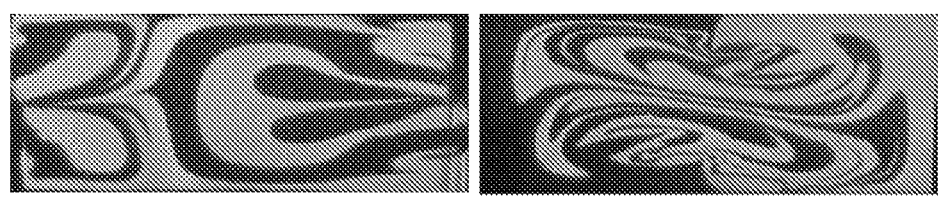
FIG. 11(c) are experimental results of dye distribution at the outputs of the channels of FIG. 11(a), wherein the features are widely spaced.

FIG. 11 shows the optimal layout for Metrics 1 and 2, the toolbox prediction of the outflow species distributions, and the experimental species distributions using compact feature spacing. The layout for Metric 1 mimics the prior art mixer but includes an identical herringbone on the top of the channel over each herringbone in the channel floor. This mixer reduces the ratio of fluids in the worst coarse cell to approximately 1.5:1, despite the fact that the two-sided mixer has 8 fewer features than the one-sided design. The efficiency of the two-sided features in optimizing Metric 1 more than compensates for the reduced length. The mixer is much more efficient than the one-sided mixer in FIG. 8 since the grooves on the ceiling can directly act on the fluid at the top of the channel. As with the one-sided result, fine features are not favored by the metric; some large islands of unmixed fluid remain that straddle multiple cells and share these cells with islands of the other fluid.

The optimal layout for Metric 2 is a combination of chevrons and herringbones similar to the optimal one-sided mixer for Metric 2. The optimal mixer uses stacked herring-bone features of opposite offset, unlike the mixer for Metric 1 which uses identical, stacked herringbones. As with the one-sided mixer for Metric 2, the two fluids are well mixed in the core of the channel and less mixed near the walls. The average outflow neighbors were separated by 11.8 cells at inflow. This average separation is less than for the one-sided mixer due to the reduced length of the two-sided mixer. For Metric 2, the increased efficiency of the two-sided features in mixing the fluid did not compensate for the drop in the total number of features compared with the one-sided mixer. Again, excellent agreement is seen between the predicted transport and the experimental result, and the difference between the optimal mixers chosen for the two metrics is striking. Table 1 below provides the values of Metrics 1 and 2 for all four geometries. The mixers optimized for Metric 2 show particularly bad performance measured by Metric 1 due to their neglecting large portions of unmixed fluid near the corners of the channel. The mixers optimized for Metric 1 perform fairly well as measured by Metric 2, but are significantly below the mixers that optimize Metric 2.

TABLE 1

Metric values for the optimal mixers

|  | Metric 1 | Metric 2 |
| --- | --- | --- |
| Optimal one-sided mixer for metric 1 (FIG. 8(a)) | 2.45:1 | 6.8 |
| Optimal one-sided mixer for metric 2 (FIG. 9(a)) | 10.1:1 | 12.6 |
| Optimal two-sided mixer for metric 1 (FIG. 11 (a), column I) | 1.48:1 | 7.9 |
| Optimal two-sided mixer for metric 2 (FIG. 11 (a), column II) | 7.77:1 | 11.8 |

The above-discussed Metrics are provided as mere examples. Any desired metric may be used to optimize a fluidic system, such as for example, metrics used to determine a fluid output profile that most closely resembles a predetermined shape or metrics used to determine a fluidic system that maximized contact with the surface of the channel.

The present invention includes a numerical toolbox for the automatic design of fluidic components optimized for a specified task. By pre-computing the Stokes flow through a set of basic features and distilling the effects of the fluid transport into a set of advection maps, the transport through a complex design that combines these features can be quickly determined. An exhaustive search of the designs featuring combinations of 5 basic one-sided features in sets of 6 produced the optimal designs for different metrics; for one metric a prior art herringbone mixer was identified as optimal. An exhaustive search of designs combining 11 basic two-sided features in groups of 4 produced a new optimal mixer for each metric. These metrics were developed to accurately identify components, which effectively stir the fluids such that small amounts of diffusion will readily complete the mixing. The toolbox assumes that consecutive features are well spaced within the component, but at the low Reynolds numbers of the current study the toolbox does an excellent job of predicting the fluid distributions even when features are spaced closely together.

Exemplary embodiments of the present invention include a device, such as for example a processor, that may be used with an input fluid profile and an output fluid profile. The input and output fluid profiles may be provided in any manner, non-limiting examples of which include predetermined profiled from a library, experimental results and simulated results. Further, the input fluid profile may be provided in a manner that is different in which the output fluid profile is provided. The device may have an input portion, a map portion and an output portion. The input portion receives the input fluid profile and the output fluid profile. The map portion creates a fluid flow map relating the output fluid profile to the input fluid profile. The output portion outputs the fluid flow map to, for example, a display device, an external computer or a memory. Further, the input portion, map portion and output portion may be distinct objects operable to perform a single respective function or a unitary object operable to perform functions of each portion.

Further, exemplary embodiments of the present invention additionally include a device-readable media, for use in a device, that is operable to instruct the device to use an input fluid profile and an output fluid profile. The input and output fluid profiles may be provided in any manner, non-limiting examples of which include predetermined profiled from a library, experimental results and simulated results. Further, the input fluid profile may be provided in a manner that is different in which the output fluid profile is provided. The device-readable media, for use in a device, may instruct the device to receive the input fluid profile and the output fluid profile, to create a fluid flow map relating the output fluid profile to the input fluid profile and to output the fluid flow map.

Further, exemplary embodiments of the present invention additionally include a combination of a device and device-readable media, for use in the device, wherein the combination of the device and device-readable media enable receipt of the input fluid profile and the output fluid profile, creation of a fluid flow map relating the output fluid profile to the input fluid profile and an output of the fluid flow map.

Further, exemplary embodiments of the present invention additionally include a signal, for use in with a device, that is operable to instruct the device to use an input fluid profile and an output fluid profile. The input and output fluid profiles may be provided in any manner, non-limiting examples of which include predetermined profiled from a library, experimental results and simulated results. Further, the input fluid profile may be provided in a manner that is different in which the output fluid profile is provided. The signal, for use in a device, may instruct the device to receive the input fluid profile and the output fluid profile, to create a fluid flow map relating the output fluid profile to the input fluid profile and to output the fluid flow map.

Further, exemplary embodiments of the present invention additionally include a combination of a device and signal, for use with the device, wherein the combination of the device and signal enable receipt of the input fluid profile and the output fluid profile, creation of a fluid flow map relating the output fluid profile to the input fluid profile and an output of the fluid flow map.

With the present invention, once fluid flow maps are determined, a toolbox (a library or bank of flow maps) may be created for use in designing fluidic systems. With the present invention, the conventional CFD equations need not be computed for each new combination of elements, which as discussed above, drastically decreases design time. As such, once fluid flow maps are determined, with the present invention many options are available, non-limiting examples of which include: determining a resultant output fluid profile corresponding to a provided input fluid profile and a provided set of features in a fluidic system; determining a resultant input fluid profile corresponding to a provided output fluid profile and a provided set of features in a fluidic system; determining resultant sets of features in a fluidic system corresponding to a provided input fluid profile and a provided output fluid profile; and determining an optimal set of features in a fluidic system, based on provided criteria, corresponding to a provided input fluid profile and a provided output fluid profile.

Further, with the present invention, once fluid flow maps are determined, they may be used by the same device in which they were created or they may be provided to an external device, non-limiting examples of which include a computer, memory or display device. The optional determined results discussed above may additionally be used by the same device in which they were determined, or they may be provided to an external device, non-limiting examples of which include a computer, memory or display device.

The foregoing description of various embodiments of the invention has been presented for purposes of illustration and description. It is not intended to be exhaustive or to limit the invention to the precise forms disclosed, and obviously many modifications and variations are possible in light of the above teaching. The exemplary embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method comprising:
creating a fluid flow map for a feature, wherein the fluid flow map defines a plurality of one-to-one relationships between any point on an input fluid profile of a fluid flowing in a direction through a channel, the input fluid profile corresponding to a disposition of the fluid at an input surface within the channel and comprising input coordinates upstream of the feature, with its corresponding point on an output fluid profile of the fluid flowing in the direction through the channel, the output fluid profile corresponding to a disposition of the fluid at an output surface within the channel and being disposed at a distance from the input surface in a direction of the fluid flow and comprising output coordinates downstream from the feature;
storing the fluid flow map in a database, the fluid flow map relating the output fluid profile to the input fluid profile for the feature; and
characterizing fluid transport through a micro-fluidic system based on the fluid flow map stored in the database, wherein the micro-fluidic system comprises the feature.

2. The method of claim 1, further comprising:
creating a second fluid flow map for a second feature, wherein the second fluid flow map plurality of one-to-one relationships between any point on a second input fluid profile of the fluid flowing in a second direction through a second channel, the second input fluid profile corresponding to a disposition of the fluid at a second input surface within the second channel and comprising input coordinates upstream of the second feature, with its corresponding point on a second output fluid profile of the fluid flowing in the second direction through the second channel, the second output fluid profile corresponding to a disposition of the fluid at a second output surface within the second channel and being disposed at distances from the second input surface in the second direction of the fluid flow and comprising output coordinates downstream from the feature
storing the second fluid flow map in a database, the second fluid flow map relating the second output fluid profile to the second input fluid profile for the feature; and
characterizing fluid transport through the micro-fluidic system based on the second fluid flow map stored in the database, wherein the micro-fluidic system comprises the second feature.

3. A method comprising:
creating a fluid flow map for each of a plurality of features, wherein each fluid flow map defines a plurality of one-to-one relationships between any point on the inflow plane upstream of the feature with its corresponding point on the outflow plane downstream of the feature;
storing the plurality of fluid flow maps in a database; and
characterizing fluid transport through a micro-fluidic system based on the fluid flow maps stored in the database, wherein the micro-fluidic system comprises one or more features.

4. The method of claim 3, wherein the plurality of features are fluid flow traversing features comprising: grooves, bumps, fins, areas of differing surface texture, areas having electric fields, and areas having gradients.

5. The method of claim 3, wherein the one-to-one relationships defined by the fluid flow map provide a match of any output coordinates with its corresponding input coordinates.

6. The method of claim 3, wherein the one-to-one relationships defined by the fluid flow map provide a match of any input coordinates with its corresponding output coordinates.

7. The method of claim 3, wherein the step of characterizing fluid transport through the micro-fluidic system comprises the step of determining an output fluid flow distribution.

8. The method of claim 7, wherein the step of determining the output fluid flow distribution comprises the steps of:
utilizing a provided input fluid distribution;
retrieving the fluid flow maps stored in the database that are associated with the features of the micro-fluidic system; and processing the fluid flow maps in sequential order with the provided input fluid distribution.

9. The method of claim 3, wherein the step of characterizing fluid transport through the micro-fluidic system comprises the step of determining an input fluid flow distribution.

10. The method of claim 9, wherein the step of determining the input fluid flow distribution comprises the steps of:
    utilizing a provided output fluid distribution;
    retrieving the fluid flow maps stored in the database that are associated with the features of the micro-fluidic system; and
    processing the fluid flow maps in sequential order with a provided input fluid distribution.

11. The method of claim 3, wherein the step of characterizing fluid transport through the micro-fluidic system comprises the step of determining one or more sets of features in the micro-fluidic system corresponding to a provided input fluid distribution and a provided output fluid distribution.

12. The method of claim 3, wherein the step of characterizing fluid transport through the micro-fluidic system comprises the step of determining an optimal set of features in micro-fluidic system based on provided criteria of fluid flow characteristics, and corresponding to a provided input fluid profile or a provided output fluid profile.

13. The method of claim 12, wherein the provided criteria comprises defining a specific type of feature to be utilized in the set of features, defining a specific number of features to be utilized in the set of features, and defining whether a pattern of features should be repeated based on fluid flow characteristics.

14. A device, comprising:
    a fluid flow map processor configured to create a fluid flow map for each of a plurality of features, wherein each fluid flow map defines a plurality of one-to-one relationships between any point on the inflow plane upstream of the feature with its corresponding point on the outflow plane downstream of the feature;
    a fluid flow map database configured to store the plurality of fluid flow maps; and
    a design processor configured to characterize fluid transport through a micro-fluidic system based on the fluid flow maps stored in the database, wherein the micro-fluidic system comprises one or more features.

15. The device of claim 14, wherein the design processor is configured to characterize fluid transport through the micro-fluidic system by determining an output fluid flow distribution.

16. The device of claim 15, wherein the design processor determines the output fluid flow distribution by:
    utilizing a provided input fluid distribution;
    retrieving the fluid flow maps stored in the fluid flow map database that are associated with the features of the micro-fluidic system; and
    processing the fluid flow maps in sequential order with the provided input fluid distribution.

17. The device of claim 14, wherein the design processor is configured to characterize fluid transport through the micro-fluidic system by determining an input fluid flow distribution.

18. The device of claim 17, wherein the design processor determines the input fluid flow distribution by:
    utilizing a provided output fluid distribution;
    retrieving the fluid flow maps stored in the fluid flow map database that are associated with the features of the micro-fluidic system; and
    processing the fluid flow maps in sequential order with a provided input fluid distribution.

19. The device of claim 14, wherein the design processor is configured to characterize fluid transport through the micro-fluidic system by determining one or more sets of features in the micro-fluidic system corresponding to a provided input fluid distribution and a provided output fluid distribution.

20. The device of claim 14, wherein the design processor is configured to characterize fluid transport through the micro-fluidic system by determining an optimal set of features in micro-fluidic system based on provided mixing criteria based on fluid flow characteristics, and corresponding to a provided input fluid profile or a provided output fluid profile.

21. The device of claim 20, wherein the provided criteria comprises defining a specific type of feature to be utilized in the set of features, defining a specific number of features to be utilized in the set of features, and defining whether a pattern of features should be repeated based on the fluid flow characteristics.

* * * * *